Patented Aug. 16, 1949

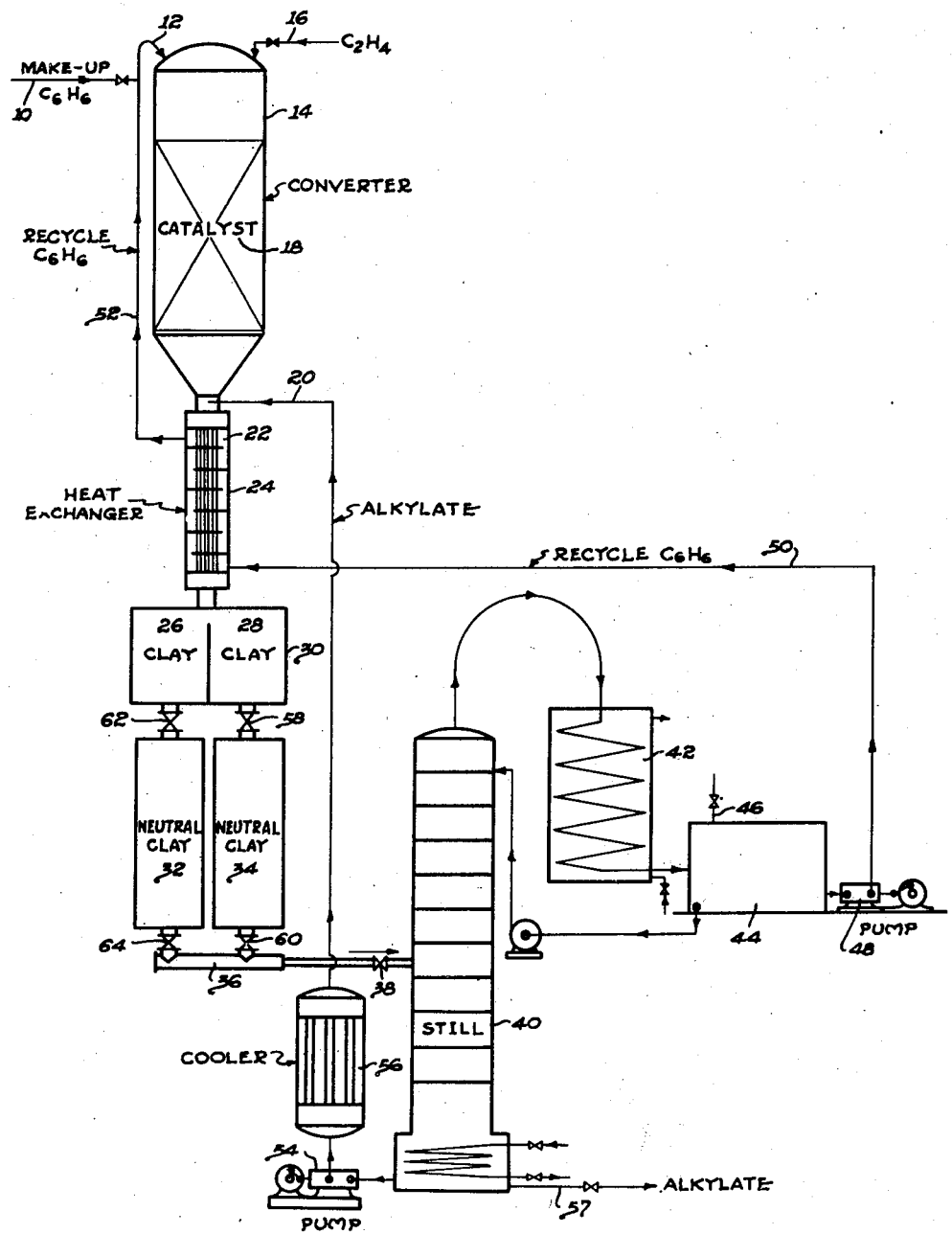

2,478,900

UNITED STATES PATENT OFFICE 2,478,900

PROCESS OF RENDERING NONCORROSIVE THE PRODUCTS RESULTING FROM CATALYTIC ALKYLATION

Edmond L. d'Ouville, Chicago, Ill., assignor to Koppers Company, Inc., Pittsburgh, Pa., a corporation of Delaware Application April 17, 1946, Serial No. 662,904

5 Claims. (Cl. 260—671)

This invention relates to a method of overcoming acid corrosion. More particularly the invention relates to the prevention of corrosion of the converter parts when carrying on a catalytic alkylation of aromatic hydrocarbons with a catalyst by which acid is released in the reaction to pass through the conversion apparatus with the conversion products.

Acids of phosphorus, particularly ortho-, meta-, and pyrophosphoric acids and the salts of these acids are active catalysts for promoting reactions such as alkylation, polymerization and isomerization. Some of these reactions require comparatively high temperatures such as 300° C. to 700° C. At these temperatures acid vapors are released from the catalyst with the conversion products and the vapors and products flow together into heat interchangers, condensers and other equipment being used in refining the reaction products. The phosphorus acids are quite corrosive and soon make equipment, such as valves, pumps, condenser tubes and the like unfit for use, especially when the conversion is carried on at high pressures.

The selectivity and activity of these phosphorus compounds catalysts is so high that it is often economical to use such catalysts, even though the acid vapors released from the catalysts must be contended with.

The primary object of the present invention is to provide a method of treating catalyst conversion products containing acid vapors to make them non-corrosive.

Another object of the invention is to provide a method of treating the conversion products obtained by the conversion of a hydrocarbon with a phosphorus acid catalyst to render the products of conversion non-corrosive.

A further object of the invention is to provide a method of treating the conversion products obtained by the alkylation of aromatic hydrocarbons with a phosphorous acid catalyst to make the products non-corrosive to the refining equipment.

A still further object of the invention is to provide a method of treating the conversion products obtained by the conversion of hydrocarbons in the presence of phosphorus acid catalysts, with an adsorbent which acts to catalyze the conversion and renders the products non-corrosive.

With these and other objects in view, the invention consists in the method of treating catalytic conversion products containing acid vapors to render them non-corrosive as hereinafter described and particularly defined in the claims.

The various features of the invention are illustrated in the accompanying drawing which is a flow sheet of an apparatus in which the method of treating corrosive vapors may be carried out.

The present invention is applicable to many types of catalytic conversion reactions in which phosphorus acids, such as ortho-, meta- and pyrophosphoric acids and the metal salts thereof are used as the catalysts. Another qualification relating to the present invention is that the catalytic reaction must be carried on at sufficiently high temperatures to vaporize phosphoric acid by the reaction of the materials being treated with the catalyst. In the claims the above-mentioned catalysts are referred to as phosphorus acid reacting catalysts which term is intended to cover ortho-, meta- and pyro-phosphoric acids, as well as the metal salts of such acids.

For example, in the alkylation of benzene with ethylene, a temperature of 325° C. is maintained at a pressure of 900 lbs. per sq. inch. When using these temperature and pressure conditions, it was found that in the first four days of operation the alkylate produced in the reaction contained 0.6 milligrams of phosphoric acid per litre. As the operation was continued, the phosphoric acid concentration increased in values as high as 15 milligrams per litre. In a thirty day test the average concentration of the phosphoric acid in the alkylate produced, was 8.7 milligrams per litre of alkylate.

When the temperature of the reaction was dropped to a temperature of 275° C., the concentration of phosphoric acid in the alkylate decreased about fifty percent. When the temperature of the reaction was increased from 325° C. to 380° C., the amount of phosphoric acid in the alkylate was increased 48%.

When the conversion products contain as much as 0.5 milligram of phosphoric acid per litre of alkylate, such a product is quite corrosive and gives much trouble with operation, particularly when the apparatus is operated at the high pressures of 900 lbs. per sq. inch.

I have found that the acid constituents in the conversion products may be effectively removed by passing the products through a neutral adsorbent which will selectively remove the acid from the conversion products.

The process of rendering the conversion products non-corrosive in accordance with the present invention may be carried out in the apparatus illustrated in the drawing as follows, the process being described with reference to the alkylation of benzene with ethylene to produce ethylbenzene. Benzene, which preferably is in a preheated and vaporized form, is introduced through a line 10 into a line 12 entering the top of a catalytic converter 14. Ethylene vapors are introduced into the top of the converter through a line 16 and mixed with the benzene vapors in the top of the converter 14. The mixture of vapors then passes through a body of catalyst 18 located in the converter. The catalyst is preferably in granular form and consists of 85% to 90% orthophosphoric acid deposited upon pumice or alumina. The vapors pass downwardly through the catalyst body and after leaving the body, the vapors are quenched or cooled preferably by alkylate which is formed in the process, this alkylate being introduced into the converter through a line 20. The alkylate acts to cool the conversion products and the mixture of conversion products and alkylate then passes downwardly through tubes 22 located in the high pressure heat exchanger 24. Preferably the tubes 22 are filled with an adsorbent, such as a high silica clay or a clay which contains a very small amount of alkaline earth metals such as calcium, magnesium, or strontium. Attapulgus clay, a well known adsorbent on the market, is well adapted for this purpose. After passing through the heat interchanger the vapors enter one or two compartments 26 or 28 in a chamber 30 which contains more granular clay. From the chambers 26 or 28 the vapors pass through another clay chamber 32 or 34. The vapors leaving the chambers 32 or 34 pass into a manifold 36 and then pass through a pressure reducing valve 38 into a still 40. All of the benzene and ethylene is not converted in the converter 14 so that the benzene is distilled out of the conversion products in the still 40. This benzene passes overhead from the still 40 through a condenser 42 and is collected in an accumulator 44. Any unconverted ethylene will pass into the accumulator 44 and may be removed through an outlet 46 from which it may be returned to the ethylene inlet 16. The benzene from the accumulator 44 is removed through a pump 48 and passes through a line 50 into the heat exchanger 24 to be preheated and then flows through a line 52 up to the line 12 to be mixed with the make-up benzene introduced through the line 10.

The alkylate for quenching the conversion products is removed from the bottom of the still 40 by means of pump 54 and passed through a cooler 56 into the line 20 to accomplish the cooling of the conversion products. The alkylate conversion product is removed from the still 40 through a valved line 57.

The cooling of the conversion products with alkylate before they are brought into contact with the adsorbent containing silica and alumina tends to cut down the corrosion effect of the conversion products on the interchanger tubes. The further cooling of the conversion products in the interchanger also assists in extracting acid constituents in the vapors when they enter the chamber 26 or 28. Two chambers 26 and 28 and chambers 32 and 34 are used in pairs, that is, when chamber 32 is used for adsorbing acid constituents from the vapors, the chamber 34 is cut off by means of valves 58 and 60. At this time chamber 34 may be opened and new neutral clay or alumina-silica compound may be introduced into the chamber. After the chamber is closed, the air and other gases may be removed and then the valves 58 and 60 may be opened to allow conversion products to pass through chamber 34. When the chamber 34 is used for the adsorption of the acid constituents, the chamber 32 may be cut off by means of valves 62 and 64 and the spent clays may be exchanged for fresh clay to be used for adsorbing the acid constituents. The chambers 26 and 28 which contain clay are used for the purpose of protecting the valves 62 and 58. Furthermore, the clay in the tubes 22 will assist in cutting down the corrosion of the conversion products to the valves 62 and 58. It has been found that by reducing the temperature of conversion products from 325° to 200° C. the adsorption capacity of the clays is greatly increased.

Another catalyst which is particularly effective in the alkylation of aromatic hydrocarbons is an iron metaphosphate salt. It has been found that this salt will give off a substantial amount of acid vapors although the amount of acid vapors released from the phosphate salt is not quite as high as the amount of acid released from a phosphoric acid catalyst. However, the phosphate salt catalysts which have been tested release a sufficient amount of vapors to make conversion products corrosive.

When the acid constituents are removed from the conversion products, it has been found that the phosphorus products will remain active as catalysts for a period of two to six months. However, in order to obtain a continuous run with phosphorus acid catalysts, it is necessary to change the clay in the scrubbers sufficiently often so that the adsorbents will not become saturated, but will actively remove the acid constituents.

Synthetic catalysts composed of silica and alumina have been made which are found to be very active as adsorbents. For example, a catalyst containing approximately 99% $SiO_2$ and 1% $Al_2O_3$ is a neutral adsorbent which will take up the acid constituents from the conversion products. Other catalysts which have varied from 1% alumina to 50% alumina, the rest being silica, have been found to be satisfactory as neutral adsorbents. These alumina-silica compounds are also very efficient as catalysts for the alkylation and polymerization of hydrocarbons. When these silica-alumina compounds are used as acid adsorbents, they also act as catalysts for the conversion and thereby have a double function. Alumina-silica catalysts which may be removed from the chambers 26, 28, 32 and 34, as well as the tubes 22, may be revivified by neutralizing with alkaline solutions and then washing in hot and cold water. The revivified catalysts are very active for the adsorption of acid constituents. The high silica clays also act as catalysts at the same time that they are used as adsorbents for the acid constituents. Most of the clays, however, contain some alkaline earth metals which react with the acid constituents. Therefore they usually are not revivified but are discarded.

The preferred form of the invention having been thus described, what is claimed as new is:

1. A process of rendering non-corrosive the products resulting from the catalytic alkylation of an aromatic hydrocarbon in the presence of phosphorus acid reacting catalysts comprising: heating the aromatic hydrocarbon with an olefine in the presence of phosphorus acid reacting catalysts at a temperature at which acid vapors are released from the catalysts and passing the conversion vapors with the acid contaminant in contact with a solid adsorbent composed of more than 75% silica and the remainder alumina to selectively remove the acid vapor contaminant.

2. The process defined in claim 1 in which the alkylation temperature is from 300° to 700° C.

3. The process defined in claim 1 in which the conversion products and acid contaminant are cooled before being passed into contact with the solid adsorbent.

4. The process defined in claim 1 in which the adsorbent is a solid catalyst material and the alkylation vapors are maintained at sufficiently high temperature to continue the conversion reaction while the vapors are being passed into contact with the catalyst to adsorb the acid contaminant.

5. The process defined in claim 1 in which the raw materials are benzene and ethylene and the adsorbent is a mixture of 75 to 99% silica and 25 to 1% alumina.

EDMOND L. D'OUVILLE.

REFERENCES CITED

The following references are of record in the file of this patent:

UNITED STATES PATENTS

| Number | Name | Date |
|---|---|---|
| 1,914,668 | Lachman | June 20, 1933 |
| 1,955,297 | Jennings | Apr. 7, 1934 |
| 2,034,712 | Dolbear | Mar. 24, 1936 |
| 2,074,198 | Alther | Mar. 16, 1937 |
| 2,160,249 | Drennan | May 30, 1939 |
| 2,220,697 | Wirth | Nov. 5, 1940 |
| 2,227,811 | Moser | Jan. 7, 1941 |
| 2,341,567 | Moriarty | Feb. 15, 1944 |
| 2,391,091 | Hewlett et al. | Dec. 18, 1945 |
| 2,391,149 | Frey | Dec. 18, 1945 |
| 2,412,229 | Schaad | Dec. 10, 1946 |
| 2,413,871 | Hepp | Jan. 7, 1947 |

FOREIGN PATENTS

| Number | Country | Date |
|---|---|---|
| 464,753 | Great Britain | Apr. 19, 1937 |